(12) United States Patent
Zhang

(10) Patent No.: US 10,261,694 B2
(45) Date of Patent: Apr. 16, 2019

(54) DATA STORAGE METHOD AND SYSTEM

(71) Applicant: Huawei Technologies Co., Ltd., Shenzhen, Guangdong (CN)

(72) Inventor: Xianfu Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

(21) Appl. No.: 15/392,856

(22) Filed: Dec. 28, 2016

(65) Prior Publication Data

US 2017/0192675 A1 Jul. 6, 2017

(30) Foreign Application Priority Data

Dec. 31, 2015 (CN) .......................... 2015 1 1027341

(51) Int. Cl.
*G06F 3/06* (2006.01)
*G06F 12/02* (2006.01)
(Continued)

(52) U.S. Cl.
CPC ............ *G06F 3/061* (2013.01); *G06F 3/0652* (2013.01); *G06F 3/0653* (2013.01);
(Continued)

(58) Field of Classification Search
CPC ...... G06F 3/061; G06F 3/0652; G06F 3/0653; G06F 3/0683
See application file for complete search history.

(56) References Cited

U.S. PATENT DOCUMENTS 5,663,924 A 9/1997 Barth, Jr. et al.
5,943,283 A 8/1999 Wong et al.
(Continued)

FOREIGN PATENT DOCUMENTS

CN 1829200 A 9/2006
CN 101515898 A 8/2009
(Continued)

OTHER PUBLICATIONS

Jahangir Hasan, et al., "Efficient Use of Memory Bandwidth to Improve Network Processor Throughput," Proceedings of the 30th Annual International Symposium on Computer Architecture (ISCA '03), Los Alamitos, CA, IEEE Comp. Soc., US, Jun. 9, 2003, pp. 300-311, XP010796923.
(Continued)

*Primary Examiner* — Nanci N Wong

(57) ABSTRACT

Embodiments of the present invention provide a data storage method and system. The data storage method is applied to a data storage system, the data storage system includes a packet processing device, a processor, an off-chip memory, and a first counter corresponding to the off-chip memory, the off-chip memory is configured to store a count value of the first counter corresponding to the off-chip memory, and the packet processing device is configured to receive and process a service packet, count the service packet by using the first counter, and maintain an original address at which the count value of the first counter is stored in the off-chip memory. The method includes: scrambling, by the processor, the original address to obtain a scrambled address; and storing, by the processor, the count value of the first counter in a storage space corresponding to the scrambled address in the off-chip memory.

13 Claims, 2 Drawing Sheets

(51) Int. Cl.
*G06F 12/06* (2006.01)
*G06F 12/14* (2006.01)

(52) U.S. Cl.
CPC ............ *G06F 3/0683* (2013.01); *G06F 12/02* (2013.01); *G06F 12/0207* (2013.01); *G06F 12/0215* (2013.01); *G06F 12/0607* (2013.01); *G06F 12/1408* (2013.01); *G06F 2212/1044* (2013.01)

(56) References Cited

U.S. PATENT DOCUMENTS

| | | | | |
|---|---|---|---|---|
| 6,493,804 | B1* | 12/2002 | Soltis | ............... G06F 12/0815 707/999.009 |
| 7,391,721 | B1 | 6/2008 | Holbrook | |
| 2006/0209827 | A1* | 9/2006 | Calvignac | ............... H04L 49/90 370/392 |
| 2008/0178053 | A1 | 7/2008 | Gorman et al. | |
| 2010/0138630 | A1* | 6/2010 | Persson | ............... G06F 9/342 711/214 |
| 2011/0099336 | A1 | 4/2011 | Yasufuku et al. | |
| 2013/0205139 | A1 | 8/2013 | Walrath | |
| 2014/0372691 | A1* | 12/2014 | Jorgensen | ............ G06F 11/348 711/105 |
| 2016/0283748 | A1* | 9/2016 | Oh | ............. G06F 21/78 |
| 2017/0090510 | A1* | 3/2017 | Tennant | ................ G06F 1/12 |

FOREIGN PATENT DOCUMENTS

| | | |
|---|---|---|
| CN | 101848150 A | 9/2010 |
| CN | 103154963 A | 6/2013 |
| CN | 103731313 A | 4/2014 |

OTHER PUBLICATIONS

Suo Ming Pu, et al., "Chip Implementation on High-Speed Packet Buffers in Network System," 2013 International Soc Design Conference (ISOCC), IEEE, Nov. 17, 2013, pp. 294-297, XP032625122.
Hao Wang, et al., "DRAM-Based Statistics Counter Array Architecture With Performance Guarantee," IEEE / ACM Transactions on Networking, IEEE / ACM, New York, NY, US, vol. 20, No. 4, Aug. 1, 2012, pp. 1040-1053, XP011458201.

* cited by examiner

DATA STORAGE METHOD AND SYSTEM

CROSS-REFERENCE TO RELATED APPLICATION

This application claims priority to Chinese Patent Application No. 201511027341.9, filed on Dec. 31, 2015, which is hereby incorporated by reference in its entirety.

TECHNICAL FIELD

Embodiments of the present invention relate to data storage technologies, and in particular, to a data storage method and system.

BACKGROUND

When a processor is in a starting phase, because a quantity of users is relatively small and service types are relatively simple, a statistical packet result obtained by a counter, namely, a count value, is directly stored in an on-chip memory. The on-chip memory is a memory in a chip in which the processor is located, and generally may be a static random access memory (SRAM). An SRAM may have quite high performance.

As a network speed and a quantity of users keep increasing, packet processing performance and capacities of each generation of processors keep increasing rapidly, and a quantity of count values also keeps increasing. Therefore, to meet an increasing capacity requirement, some count values of a same service need to be stored in an on-chip memory, and some other count values need to be stored in an off-chip memory. Generally, an off-chip memory may be a dynamic random access memory (DRAM), and each DRAM includes multiple DRAM banks. The DRAM bank may be understood as a storage space in a DRAM. As being limited by timing parameters such as a time of row cycling (tRC) and a four act win time (tFAW), maximum performance of a DRAM bank can reach only approximately 20 Mops. Currently, in a data storage process, data is generally stored in an order of DRAM banks. When a DRAM bank is full, data is stored in a next DRAM bank. By means of this storage manner, performance of a whole DRAM can reach only approximately 20 Mops.

Therefore, a problem in the prior art is that data storage is slow and inefficient.

SUMMARY

Embodiments of the present invention provide a data storage method and system, so as to improve efficiency of data storage.

According to a first aspect, an embodiment of the present invention provides a data storage method, where the data storage method is applied to a data storage system, the data storage system includes a packet processing device, a processor, an off-chip memory, and a first counter corresponding to the off-chip memory, the off-chip memory is configured to store a count value of the first counter corresponding to the off-chip memory, and the packet processing device is configured to receive and process a service packet, count the service packet by using the first counter, and maintain an original address at which the count value of the first counter is stored in the off-chip memory, the method including:

scrambling, by the processor, the original address to obtain a scrambled address; and storing, by the processor, the count value of the first counter in a storage space corresponding to the scrambled address in the off-chip memory.

Count values of the first counter can be evenly stored in storage spaces in the off-chip memory by scrambling the foregoing original address, so as to improve a speed and efficiency of data storage.

The storing, by the processor, the count value of the first counter in a storage space corresponding to the scrambled address in the off-chip memory includes:

receiving, by the processor, data that is sent by the packet processing device and that is obtained after the count value is randomly decomposed; and storing, in different subspaces in the storage space by the processor, the data that is obtained after the count value is randomly decomposed.

Count values are hashed into different subspaces, so as to avoid a problem of a slow speed and low efficiency of storage because the count values are all stored in a same subspace.

Further, the data storage system further includes an on-chip memory and a second counter corresponding to the on-chip memory, the method further including:

if the processor determines that the second counter is not updated within a preset time period;

deleting, by the processor, a correspondence between the second counter and any on-chip memory, and establishing a correspondence between the second counter and any off-chip memory, so as to use the second counter as the first counter and store a new obtained count value in the any off-chip memory.

Further, the data storage system further includes a third counter corresponding to the on-chip memory, and data update frequency of the third counter is higher than that of the second counter, the method further including:

establishing a correspondence between the any on-chip memory and the third counter, so as to store a count value of the third counter in the any on-chip memory.

Generally, performance of an on-chip memory is higher than that of an off-chip memory, so that a counter having a large amount of computation can correspond to an on-chip memory by using this manner. For example, the foregoing third counter corresponds to an on-chip memory. Finally, a bit width of a counter corresponding to an on-chip memory can be reduced.

The following describes a data storage system provided in an embodiment of the present invention. A system part corresponds to the foregoing method, corresponding content has a same technical effect, and details are not described herein again.

According to a second aspect, an embodiment of the present invention provides a data storage system, including: a packet processing device, a processor, an off-chip memory, and a first counter corresponding to the off-chip memory, where the off-chip memory is configured to store a count value of the first counter corresponding to the off-chip memory;

the packet processing device is configured to receive and process a service packet, count the service packet by using the first counter, and maintain an original address at which the count value of the first counter is stored in the off-chip memory; and the processor is configured to scramble the original address to obtain a scrambled address, and store the count value of the first counter in a storage space corresponding to the scrambled address in the off-chip memory.

Optionally, the packet processing device is further configured to randomly decompose the count value; and the processor is further configured to receive data that is sent by the packet processing device and that is obtained after the count value is randomly decomposed, and store, in different subspaces in the storage space, the data that is obtained after the count value is randomly decomposed.

Optionally, the data storage system further includes an on-chip memory and a second counter corresponding to the on-chip memory, and the processor is further configured to: if the processor determines that the second counter is not updated within a preset time period, delete a correspondence between the second counter and any on-chip memory, and establish a correspondence between the second counter and any off-chip memory, so as to use the second counter as the first counter and store a new obtained count value in the any off-chip memory.

Optionally, the data storage system further includes a third counter corresponding to the on-chip memory, and data update frequency of the third counter is higher than that of the second counter; and the processor is further configured to establish a correspondence between the any on-chip memory and the third counter, so as to store a count value of the third counter in the any on-chip memory.

The embodiments of the present invention provide the data storage method and system. The data storage method is applied to a data storage system, the data storage system includes a packet processing device, a processor, an off-chip memory, and a first counter corresponding to the off-chip memory. The off-chip memory is configured to store a count value of the first counter corresponding to the off-chip memory. The packet processing device is configured to receive and process a service packet, count the service packet by using the first counter, and maintain an original address at which the count value of the first counter is stored in the off-chip memory. The method includes: scrambling, by the processor, the original address to obtain a scrambled address; and storing, by the processor, the count value of the first counter in a storage space corresponding to the scrambled address in the off-chip memory. Count values of a first counter can be evenly stored in storage spaces in an off-chip memory by scrambling an original address at which a count value of the first counter is stored in the off-chip memory, so as to improve a speed and efficiency of data storage.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In a processor chip, a counter is needed to count packets. As a network speed and a quantity of users keep increasing, packet processing performance and capacities of each generation of processors keep increasing rapidly, and statistical results, that is, count values of a counter, of packets also keep increasing. Therefore, an on-chip memory may fail to meet a requirement of storing a large quantity of count values. In this case, an increasing capacity requirement can be met only by using an off-chip memory. Generally, an off-chip memory may be a DRAM, and maximum performance of each DRAM can reach only approximately 20 Mops. As being limited by performance of a DRAM bank, a problem of a slow speed and low efficiency of storage when all statistical packet results are stored in a same DRAM bank. To resolve the problem in the prior art, embodiments of the present invention provide a data storage method and system.

Figure 1:
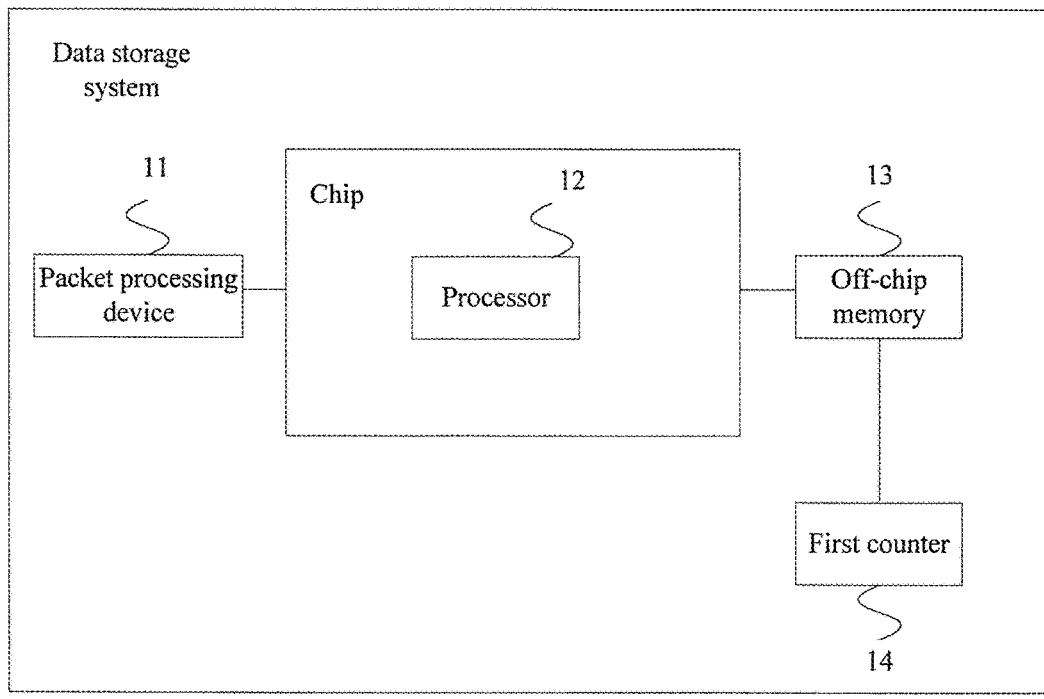
FIG. 1 is an architectural diagram of a data storage system according to an embodiment of the present invention.

FIG. 1 is an architectural diagram of a data storage system according to an embodiment of the present invention. The data storage system includes: a packet processing device 11, a processor 12, an off-chip memory 13, and a first counter 14 corresponding to the off-chip memory 13. The packet processing device 11 includes a receiver and a central processing unit (CPU), the off-chip memory 13 is configured to store a count value of the first counter corresponding to the off-chip memory 13, and the packet processing device 11 is configured to receive and process a service packet, count the service packet by using the first counter 14, and maintain an original address at which the count value of the first counter 14 is stored in the off-chip memory 13. This embodiment of the present invention is based on the system architecture diagram shown in FIG. 1.

Before the data storage method is described, the present invention first describes a concept of a DRAM bank group. The DRAM bank group is a group including multiple DRAM banks.

Figure 2:
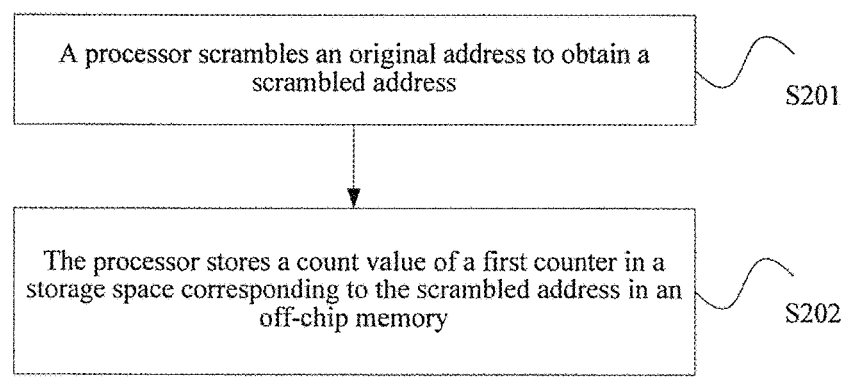
FIG. 2 is a flowchart of a data storage method according to an embodiment of the present invention.

FIG. 2 is a flowchart of a data storage method according to an embodiment of the present invention. The method is applicable to a scenario in which statistical packet results are stored, and is executed by a processor. The method specifically includes:

S201: The processor scrambles an original address to obtain a scrambled address.

S202: The processor stores a count value of a first counter in a storage space corresponding to the scrambled address in an off-chip memory.

Specifically, once a receiver in a packet processing device receives a service packet, the processor starts to scramble an original address stored in the off-chip memory. The original address is determined by a CPU in the packet processing device, and the processor performs the following address scrambling based on the original address. The off-chip memory may be a DRAM, the processor may use a cyclic redundancy check (CRC) algorithm to scramble an address in the off-chip memory, or may randomly generate a scrambling value. For example, the process of using the cyclic redundancy check (CRC) algorithm to scramble an original address stored in the off-chip memory is as follows: assuming that an original address stored in the off-chip memory is 1011001, a corresponding polynomial is $m(x)=x^6+x^4+x^3+1$; assuming that a generator polynomial is $g(x)=x^4+x^3+1$, a code corresponding to $g(x)$ is 11001, and a code corresponding to $x^4m(x)=x^{10}+x^8+x^7+x^4$ is 10110010000. A remainder 1010 is obtained by using polynomial division, and the remainder 1010 is a scrambling value. Therefore, a scrambled address is a sum of the original address 1011001 and the remainder 1010. When address scrambling is performed a next time, scrambling is performed again on the basis of the scrambled address or on the basis of the original address, and a scrambling value is different each time.

An original address stored in an off-chip memory is scrambled, and the scrambled address corresponds to a storage space corresponding to a DRAM bank group, and then a count value is stored in the storage space. Each DRAM bank group includes multiple banks. It is assumed that a DRAM bank group can store 1 M of counter entries, namely, 1 M of count values of a counter, and 8 M of counter entries need to be stored. In the prior art, that is, if without scrambling, count values of a counter on continuous addresses are received, these count values corresponding to the counter are sent to a same DRAM bank group. If write frequency of these count values of the counter on continuous addresses exceeds write frequency acceptable to a single DRAM bank group, a loss of a count value occurs. After address scrambling is added, these count values of the counter on continuous addresses are evenly distributed into 8 (8 M/1 M) bank groups by means of the scrambling algorithm. Therefore, as long as the write frequency of these count values of the counter on continuous addresses does not exceed a sum of write frequency acceptable to the 8 DRAM bank groups, a loss of a count value does not occur.

In addition, the first counter is a counter that corresponds to an off-chip memory and that is configured to count a quantity of packets of a service such as a voice service or a short message service.

By means of the data storage method provided by this embodiment of the present invention, count values of a counter can be evenly stored in storage spaces in an off-chip memory by scrambling an original address stored in the off-chip memory, so as to improve a speed and efficiency of data storage.

Figure 3:
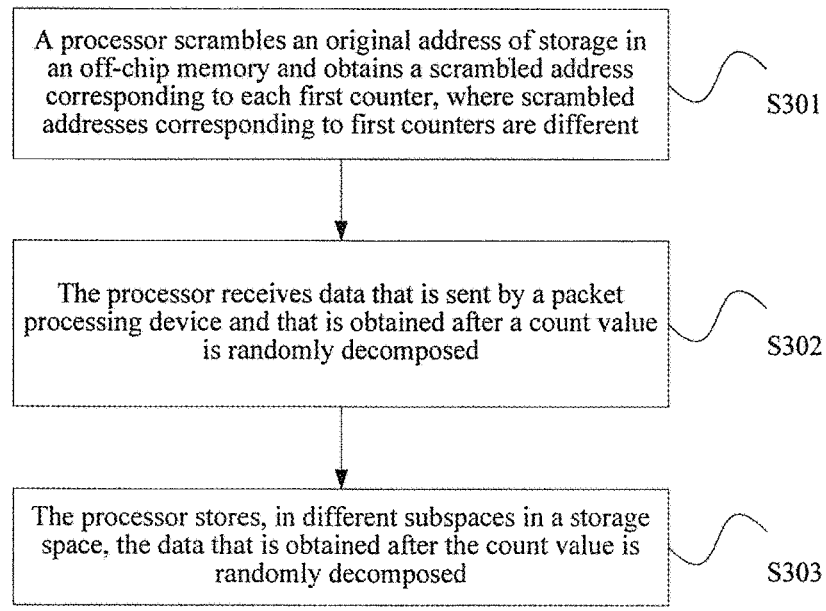
FIG. 3 is a flowchart of a data storage method according to another embodiment of the present invention.

Further, FIG. 3 is a flowchart of a data storage method according to another embodiment of the present invention. As shown in FIG. 3, the method includes:

S301: A processor scrambles an original address stored in an off-chip memory and obtains a scrambled address corresponding to each first counter, where scrambled addresses corresponding to first counters are different.

S301 is the same as S201, and details are not described herein again.

S302: The processor receives data that is sent by a packet processing device and that is obtained after a count value is randomly decomposed.

S303: The processor stores, in different subspaces in a storage space, the data that is obtained after the count value is randomly decomposed.

It should be noted that the subspaces herein may be understood as DRAM banks.

Specifically, for example, a count value of a counter is 12, and is originally stored in one DRAM bank group. By means of this embodiment of the present invention, the count value 12 may be decomposed and hashed into N DRAM banks, where N is greater than or equal to 2. For example, if N is equal to 6, each DRAM bank stores only a count value 2. Due to unevenness of hashing, some DRAM banks may store a count value 1 or 3. If performance of one DRAM bank is 20 Mops, after the count value is hashed into 6 banks, performance is equivalent to 120 (6*20) Mops.

Count values are hashed into different DRAM banks, so as to avoid a problem of a slow speed and low efficiency of storage because the count values are all stored in a same DRAM bank.

Further, the method further includes:

if the processor determines that any on-chip memory does not update a count value obtained by a second counter within a preset time period;

deleting, by the processor, a correspondence between the second counter and the any on-chip memory, and establishing a correspondence between the second counter and any off-chip memory, so as to use the second counter as the first counter and store a new obtained count value in the any off-chip memory, where the any on-chip memory is any memory in a chip in which the processor is located; and the second counter is any counter that corresponds to the any on-chip memory and that is configured to count a quantity of packets of a service.

Specifically, assuming that a counter A is configured to count packet data of a short message service, when the processor determines that an on-chip memory B has not updated a count value obtained by the counter A within a preset time period, the counter A may be associated with a particular off-chip memory C, that is, a count value of the counter A is stored in the off-chip memory C, thereby lowering memory waste in the on-chip memory.

Further, after the deleting, by the processor, a correspondence between the second counter and the any on-chip memory, the method further includes:

establishing, by the processor, a correspondence between the any on-chip memory and a third counter, so as to store a count value of the third counter in the any on-chip memory, where the third counter is any counter that corresponds to the any on-chip memory and that is configured to count a quantity of packets of a service, and data update frequency of the third counter is higher than that of the second counter.

Generally, performance of an on-chip memory is higher than that of an off-chip memory, so that a counter having a large amount of computation can correspond to an on-chip memory by using this manner. For example, the foregoing third counter corresponds to an on-chip memory. Finally, a bit width of a counter corresponding to an on-chip memory can be reduced.

Optionally, the method further includes: determining, by the processor, whether an on-chip memory stores a quantity of packets of a particular service; and if yes, acquiring, by the processor, that a total quantity of packets of the service is a sum of a quantity of packets of the service that is stored in the on-chip memory and a quantity of packets of the service that is stored in the off-chip memory.

Specifically, an on-chip memory is generally an SRAM. The processor first determines whether the on-chip memory stores a quantity of packets of the foregoing service, for example, whether the on-chip memory stores a quantity of packets of a short message service or whether the on-chip memory stores a quantity of packets of a voice service. If the on-chip memory stores the quantity of packets, for example, a quantity of packets of a short message service that is stored in an on-chip memory is 10000, and a quantity of packets of a short message service that is stored in an off-chip memory is 10000, then a total quantity of packets is 20000.

An embodiment of the present invention further provides a data storage system. As shown in FIG. 1, the data storage system includes: a packet processing device 11, a processor 12, an off-chip memory 13, and a first counter 14 corresponding to the off-chip memory 13. The packet processing device 11 includes a receiver and a CPU, the off-chip memory 13 is configured to store a count value of the first counter 14 corresponding to the off-chip memory 13, and the packet processing device 11 is configured to receive and process a service packet, count the service packet by using the first counter 14, and maintain an original address at which the count value of the first counter 14 is stored in the off-chip memory 13.

Specifically, the packet processing device 11 is further configured to randomly decompose the count value; and the processor 12 is further configured to receive data that is sent by the packet processing device and that is obtained after the count value is randomly decomposed, and store, in different subspaces in a storage space, the data that is obtained after the count value is randomly decomposed.

Figure 4:
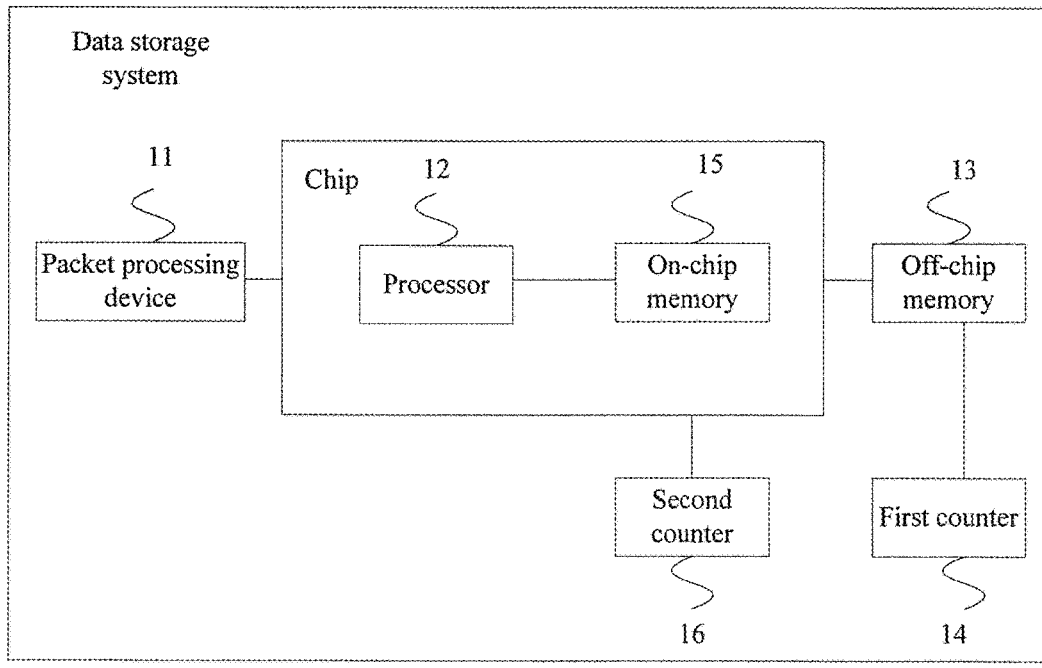
FIG. 4 is an architectural diagram of a data storage system according to another embodiment of the present invention.

Further, FIG. 4 is an architectural diagram of a data storage system according to another embodiment of the present invention. Based on the data storage system shown in FIG. 1, the data storage system further includes an on-chip memory 15 and a second counter 16 corresponding to the on-chip memory 15. The processor 12 is further configured to: if the processor 12 determines that the second counter 16 is not updated within a preset time period, delete, a correspondence between the second counter 16 and any on-chip memory 15, and establish a correspondence between the second counter 16 and any off-chip memory 13, so as to use the second counter 16 as the first counter 14 and store a new obtained count value in the any off-chip memory 13.

Further, the data storage system further includes a third counter corresponding to the on-chip memory 15, and data update frequency of the third counter is higher than that of the second counter. The processor 12 is further configured to establish a correspondence between the any on-chip memory 15 and the third counter, so as to store a count value of the third counter in the any on-chip memory 15.

The data storage system of this embodiment can be used to execute the foregoing data storage method, and has similar implementation principles and technical effects, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can storage program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data storage method, wherein the data storage method is applied to a data storage system, the data storage system comprises a packet processing device, a processor, an off-chip memory, and a first counter corresponding to the off-chip memory, the off-chip memory is configured to store a count value of the first counter corresponding to the off-chip memory, and the packet processing device is configured to receive and process a service packet, count the service packet by using the first counter, and maintain an original address at which the count value of the first counter is stored in the off-chip memory, the method comprising:
   generating a scrambling value for each count value to be stored;
   scrambling, by the processor, the original address to obtain a scrambled address, wherein the scrambled address comprises the sum of the original address and the scrambling value;
   storing, by the processor, the count value of the first counter in a storage space corresponding to the scrambled address in the off-chip memory;
   wherein the storage space comprises a plurality of DRAM bank groups, wherein each DRAM bank group comprises multiple DRAM banks and each respective DRAM bank group of the plurality of DRAM bank groups corresponds to a different scrambling value; and
   wherein storing, by the processor, the count value of the first counter in the storage space corresponding to the scrambled address in the off-chip memory further comprises:
   storing the count value in a respective DRAM bank group corresponding to the generated scrambling value.

2. The method according to claim 1, wherein the storing, by the processor, the count value of the first counter in a storage space corresponding to the scrambled address in the off-chip memory comprises:
   receiving, by the processor, data that is sent by the packet processing device and that is obtained after the count value is randomly decomposed;
   storing, in different subspaces in the storage space by the processor, the data that is obtained after the count value is randomly decomposed; and
   wherein the different subspaces in the storage space comprise different DRAM banks within the respective DRAM bank group corresponding to the generated scrambling value.

3. The method according to claim 1, wherein the data storage system further comprises an on-chip memory and a second counter corresponding to the on-chip memory, the method further comprising:
   when the processor determines that the second counter is not updated within a preset time period, deleting, by the processor, a correspondence between the second counter and the on-chip memory, and establishing a correspondence between the second counter and any off-chip memory, so as to use the second counter as the first counter and store a new obtained count value in the any off-chip memory.

4. The method according to claim 3, wherein:
   the data storage system further comprises a third counter corresponding to the on-chip memory, and data update frequency of the third counter is higher than that of the second counter; and
   the method further comprises:

establishing a correspondence between the on-chip memory and the third counter, so as to store a count value of the third counter in the on-chip memory.

5. The method according to claim 1, wherein generating a scrambling value comprises:
generating the scrambling value using a cyclic redundancy check (CRC) algorithm, comprising,
generating a first polynomial code based on the original address;
generating a second polynomial code based on a generator polynomial;
using polynomial division to divide the first polynomial code by the second polynomial code to obtain a remainder; and
using the remainder as the scrambling value.

6. The method according to claim 1, wherein the scrambling value is randomly generated based on the previous scrambled address.

7. A data storage system, comprising: a packet processing device, a processor, an off-chip memory, and a first counter corresponding to the off-chip memory, wherein:
the off-chip memory is configured to store a count value of the first counter corresponding to the off-chip memory;
the packet processing device is configured to receive and process a service packet, count the service packet by using the first counter, and maintain an original address at which the count value of the first counter is stored in the off-chip memory;
the processor is configured to generate a scrambling value, for each count value to be stored, scramble the original address to obtain a scrambled address, wherein the scrambled address comprises the sum of the original address and the scrambling value, and store the count value of the first counter in a storage space corresponding to the scrambled address in the off-chip memory;
wherein the storage space comprises a plurality of DRAM bank groups, wherein each DRAM bank group comprises multiple DRAM banks and each respective DRAM bank group of the plurality of DRAM bank groups corresponds to a different scrambling value; and
to store the count value of the first counter in the storage space corresponding to the scrambled address in the off-chip memory, the processor is further configured to: store the count value in a respective DRAM bank group corresponding to the generated scrambling value.

8. The system according to claim 7, wherein:
the packet processing device is further configured to randomly decompose the count value; and
the processor is further configured to receive data that is sent by the packet processing device and that is obtained after the count value is randomly decomposed, and store, in different subspaces in the storage space, the data that is obtained after the count value is randomly decomposed; and
the different subspaces in the storage space comprise different DRAM banks within the respective DRAM bank group corresponding to the generated scrambling value.

9. The system according to claim 7, wherein:
the data storage system further comprises an on-chip memory and a second counter corresponding to the on-chip memory; and
the processor is further configured to:
when the processor determines that the second counter is not updated within a preset time period, deleted a correspondence between the second counter and the on-chip memory, and establish a correspondence between the second counter and any off-chip memory, so as to use the second counter as the first counter and store a new obtained count value in the any off-chip memory.

10. The system according to claim 9, wherein:
the data storage system further comprises a third counter corresponding to the on-chip memory, and data update frequency of the third counter is higher than that of the second counter; and
the processor is further configured to establish a correspondence between the on-chip memory and the third counter, so as to store a count value of the third counter in the on-chip memory.

11. The system according to claim 7, wherein the processor is configured to:
generate the scrambling value using a cyclic redundancy check (CRC) algorithm.

12. The system according to claim 11, wherein to generate the scrambling value using a cyclic redundancy check (CRC) algorithm, the processor is configured to: generate the scrambling value using a cyclic redundancy check (CRC) algorithm; generate a first polynomial code based on the original address; generate a second polynomial code based on a generator polynomial; use polynomial division to divide the first polynomial code by the second polynomial code to obtain a remainder; and use the remainder as the scrambling value.

13. The system according to claim 7, wherein the processor is configured to randomly generate the scrambling value on the basis of the previous scrambled address.

* * * * *